July 20, 1965
C. J. CISLO
3,195,877
SELF-ENERGIZING HYDRAULIC LEVELING DEVICE
FOR VEHICLE SUSPENSION
Filed Feb. 11, 1963
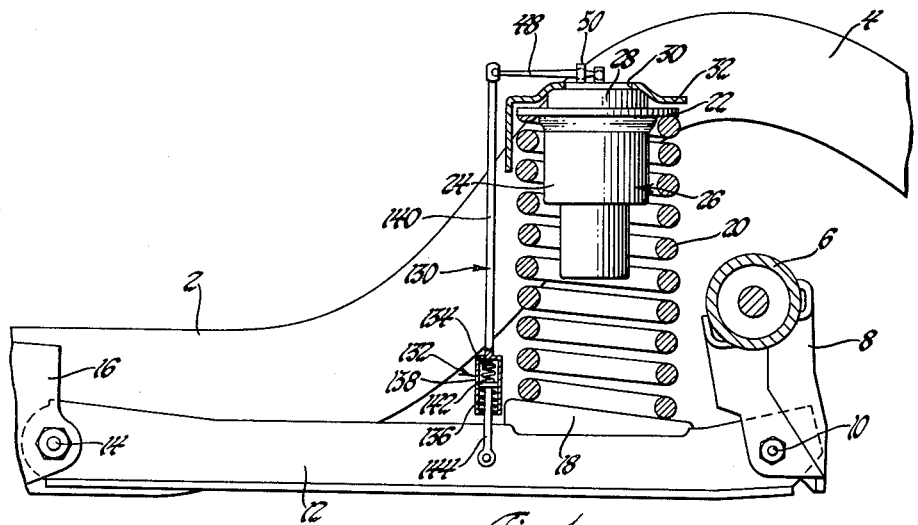
Fig. 1
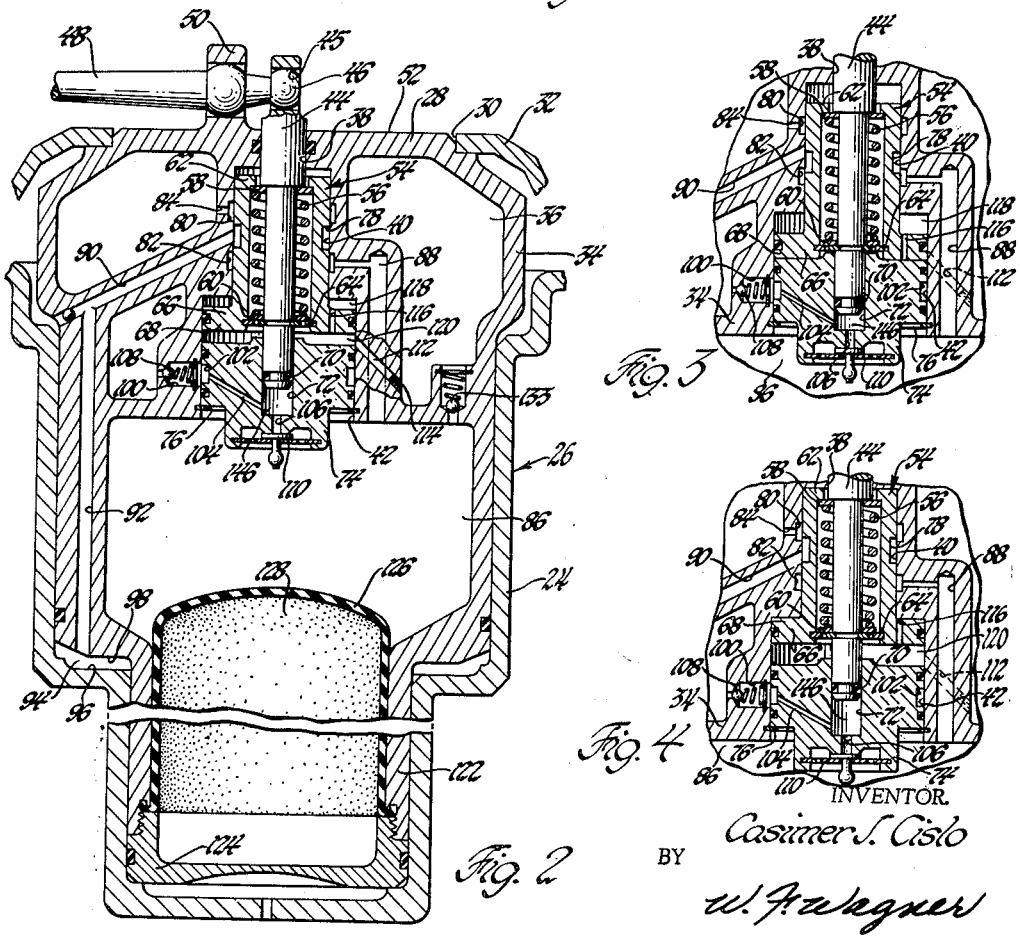
Fig. 2
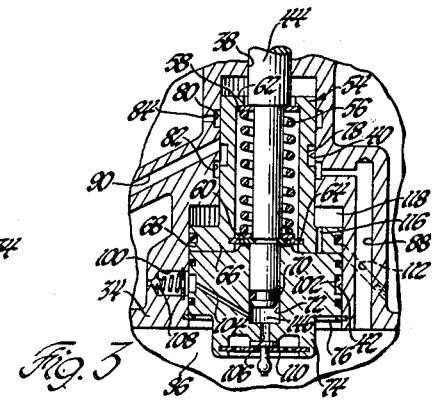
Fig. 3
Fig. 4
INVENTOR.
Casimer J. Cislo
BY
W. F. Wagner
ATTORNEY

United States Patent Office  3,195,877
Patented July 20, 1965

3,195,877
SELF-ENERGIZING HYDRAULIC LEVELING DEVICE FOR VEHICLE SUSPENSION
Casimer J. Cislo, Detroit, Mich., assignor to General Motors Corporation, Detroit, Mich., a corporation of Delaware
Filed Feb. 11, 1963, Ser. No. 257,629
6 Claims. (Cl. 267—60)

This invention relates to vehicle suspension and more particularly to coil spring suspension including associated apparatus for maintaining the vehicle sprung mass at a constant height irrespective of load imposed thereon.

An object of the invention is to provide an improved vehicle suspension.

Another object is to provide a coil spring suspension for vehicles incorporating hydraulically extensible spring seats which are automatically operable to vary the vertical level of the upper end of the coil spring relative to the sprung mass of the vehicle so that compression of the coil spring resulting from increased load on the vehicle sprung mass is offset by increasing the vertical distance between the spring seat and sprung mass, thereby maintaining the sprung mass at a constant height irrespective of load.

A further object is to provide an arrangement of the stated character wherein the displaceable spring seats incorporate height sensible automatic control means for varying the displaced position of the extensible spring seats.

A still further object is to provide a device of the stated character in which the fluid pressure required to operate the displaceable spring seat is provided by pressure generating means contained entirely within the displaceable spring seat structure.

Yet a further object is to provide a structure of the stated character in which the pressure generating means is operated by random vertical deflection of the suspension structure.

Still a further object is to provide an in-line fluid flow control valve and fluid pump having a common actuating element.

Still another object is to provide a self-energizing hydraulic leveling device in which both the energizing and leveling function are controlled by axial displacement of a common element.

A yet further object is to provide a hydraulically displaceable spring seat assembly having an internally disposed fluid flow control apparatus and fluid pressure generating apparatus which are selectively operable as an automatic function of duration of displacement of the common element.

In accordance with the general features of the invention, there is provided a hydraulically displaceable spring seat assembly wherein a piston rigidly secured to the vehicle sprung mass is surrounded by a generally cup-shaped cylinder adapted for telescoping movement relative thereto by introduction and evacuation of fluid between the piston and cylinder. The piston element carries an axially slidable spool valve and a fixed pump body disposed below and in axial alignment therewith. An externally actuated plunger element is reciprocably disposed concentrically within the spool valve and projects into the pump body. The piston element is cored to provide a fluid reservoir and formed with hydraulic fluid intake and exhaust passages arranged with reference to the spool valve so that flow of fluid into or out of the space between the piston and cylinder is controlled by the axial position of the spool valve relative to the piston. The pump body is arranged in series communication between the reservoir portion of the piston and an accumulator chamber, also contained in the piston. Check valve means associated with the pump body operate in concert with vertical displacement of the plunger to provide more or less constant flow of hydraulic fluid into an accumulator chamber contained within the piston. The accumulator chamber in turn is fitted with a flexible walled container filled with an inert gas under pressure which operates to exert a constant pressure on the fluid contained within the accumulator chamber to enable return thereof through the spool valve to displace the cylinder relative to the piston. To provide for discriminant operation of the spool valve, the latter is provided with a piston flange container within a dashpot cavity formed in the piston element which is ported in a manner requiring sustained displacement of the plunger to effect displacement of the spool by the resilient connection with the plunger. A resilient connection between the plunger and spool valve enables the latter to move in either direction from a neutral position without corresponding displacement of the spool as long as the duration of movement of the plunger is insufficient to override the retarding action of the dashpot. Accordingly, the spool valve is insensitive to short term displacement of the plunger which, therefore, functions under normal suspension only to operate the pump. However, upon sustained displacement of the plunger in either direction, the spool valve gradually moves from the neutral position to either an exhaust or intake position depending upon the direction of displacement, thereby causing the cylinder element to move either upwardly or downwardly as the case may be.

The foregoing and other objects, advantages and features of the invention will become more fully apparent as reference is had to the accompanying specification and drawing wherein:

FIGURE 1 is a partially sectioned side elevational view of a portion of a vehicle suspension incorporating the invention;

FIGURE 2 is an enlarged sectional elevational view illustrating details of construction of the displaceable spring seat assembly shown in FIGURE 1, the elements of the height control mechanism being shown in the neutral position obtaining under conditions of normal loading of the vehicle sprung mass;

FIGURE 3 is a fragmentary sectional view of a portion of FIGURE 2 illustrating the height control mechanism in the position occupied when the load on the sprung mass is greater than normal load; and FIGURE 4 is a view similar to FIGURE 3 showing the relative position of the height control mechanism when the load on the sprung mass is less than normal load.

Referring now to the drawings and particularly FIGURE 1, the reference numeral 2 designates the longitudinally extending side rail of a vehicle frame which includes a trailing kick-up portion 4 overlying one end of a transversely disposed vehicle axle housing 6. Rigidly connected to and depending from axle housing 6 is bracket 8, the lower end of which is pivotally connected at 10 to the rear end of a longitudinally extending suspension control arm 12. The forward end of control arm 12 in turn is pivotally connected at 14 to an outrigger bracket 16 mounted on the side wall of frame side rail 2. Rigidly mounted on the upper surface of control arm 12 longitudinally intermediate thereof is a fixed lower spring seat 18 on which is supported the lower end of a coil spring 20. The upper end of spring 20 in turn engages a flange 22 formed on the upper end of cylinder portion 24 of a vertically displaceable upper spring seat assembly 26. Assembly 26 includes a piston element 28 disposed within cylinder portion 24, the upper end of which is rigidly secured in an opening 30 formed in an outrigger bracket 32 mounted on flange kick-up 4 in general vertical alignment with lower spring seat 18. The cylinder portion 24 of assembly 26 telescopingly embraces piston 28 and is adapted to be displaced downwardly relative to the piston by introduction of hydraulic fluid in a manner shortly to be described, so that as coil spring 20 is compressed as a result of increased loading on frame 2, the flange portion 22 of cylinder 24 descends relative to the frame an amount equal to the compression deflection of of the coil spring and thereby restores the sprung mass to the height obtaining under normal load conditions. Exhausting of hydraulic fluid, in a manner also shortly to be described, provides for discharge of hydraulic fluid when the vehicle loading decreases, thereby allowing cylinder 24 to ascend as the coil spring depression decreases.

To automatically regulate the flow of hydraulic fluid and accomplish self-energization of the fluid system in accordance with the invention, as seen best in FIGURE 2, the piston element 28 is provided with a cored upper portion 34 which includes an annular reservoir cavity 36 surrounding a vertical passage comprising aligned bores 38, 40 and 42 of progressively increasing diameter. Slidably disposed within the bore 38 is a plunger element 44, the upper end of which is formed with a socket 45 pivotally engaged by the ball end 46 of an operating lever 48 fulcrumed in an eye 50 formed on the top wall 52 of piston element 28. Plunger element 44 extends downwardly through bore 38 into bore 40, at which level it is surrounded by an annular spool valve 54 which slidably interfits bore 40. Impositive driving engagement between plunger 44 and spool valve 54 is effected by means of a coil spring 56 which surrounds plunger 44 and is disposed in compression between an upper washer 58 and a lower washer 60. Upper washer 58 abuts an inturned flange 62 formed on the upper end of spool 54, while lower washer 60 abuts a snap ring 64 mounted near the lower end 66 of spool 54. The lower extremity 66 of spool 54 is formed with a radially outwardly extending flange piston 68 slidably interfitting the upper end of bore 42, the purpose of which will appear shortly. The lower end of plunger 44 carries a flexible piston ring 70 and extends into a bore 72 formed in a pump body 74 which in turn is retained by snap ring 76 in the lower portion of bore 42 at a level permitting a predetermined range of vertical travel of flange piston 68.

Intermediate its ends, spool valve 54 is provided with an annular relief 78 which under normal conditions occupies a vertical level intermediate a pair of vertically spaced circumferential grooves 80 and 82 formed in the wall of bore 40. Groove 80 establishes communication with reservoir 36 by means of a port 84, while groove 82 effects communication by means of a passage 88 with an accumulator chamber 86 formed in piston element 28 below pump body 74. A passage 90 establishes communication with the interior of bore 40 intermediate grooves 80 and 82. Passage 90 in turn communicates with a vertical passage 92 leading to an annular space 94 located between the stepped bottom wall 96 of cylinder 24 and the shoulder 98 of piston 28.

Fluid communication between reservoir 36 and accumulator 86 via pump body 74 is effected by a passage 100 formed in the wall portion surrounding bore 42 which communicates with an annular relief 102 formed in pump body 74. Groove 102 in turn communicates with the bore 72 in pump body 74 via a passage 104. Bore 72 in turn communicates with accumulator 86 via a vertical passage 106 formed in the base of pump body 74. A pair of check valves 108 and 110 are located respectively in bore 100 and adjacent bore 106 for a purpose shortly to be described.

The upper portion of bore 42 between pump body 74 and bore 40 is placed in fluid communication with reservoir 36 by a passage 112 having a restriction orifice 114 formed therein. A passage 116 extends through the flange piston 68 to establish communication between the upper and lower spaces 118 and 120 established at opposite sides of flange piston 68.

Disposed below accumulator chamber 86 and secured within the lower end 122 of piston 28 by threaded cap 124 is an elastomeric inverted cup-shaped member 126 which defines a compressible chamber 128 containing a permanent high pressure charge of inert gas such as nitrogen.

Initially, a predetermined quantity of hydraulic fluid is introduced into the reservoir 36 and accumulator chamber 86, which fluid thereafter is subjected to distribution and control in the following manner. With the cylinder 24 in fully collapsed relation to piston 28, assume that reservoir 36 is substantially filled with hydraulic fluid and that the accumulator chamber 86 contains an additional quantity of hydraulic fluid sufficient to cause substantial further compression of the inert gas contained within chamber 128. Under these circumstances, the pressure in chamber 128 exerts a corresponding pressure on the fluid contained within chamber 86, causing it to enter passage 88. With the spool valve 54 in the neutral position shown in FIGURE 2, fluid in passage 88 is permitted to emerge into groove 82 of bore 40 but remains trapped therein. However, upon downward displacement of plunger 54, coil spring 56 is momentarily compressed further as the washer 58 moves downwardly away from flange 62 on spool valve 54. The additional compression thus effected exerts downward biasing force on the spool valve through washer 60 urging the spool valve toward the position shown in FIGURE 3. The time rate response of downward movement of spool valve 54 is retarded by the dashpot action of flange piston 68 moving through the hydraulic fluid medium contained within the upper portion of bore 42, the specific rate of response being determined by the size of passage 116 through which transfer of fluid on the lower side of piston 68 toward the upper side thereof is effected. As soon as spool valve 54 reaches the position shown in FIGURE 3, the annular clearance 78 formed in the spool valve is brought into partial registration with lower groove 82 and with passage 90 enabling fluid pressurized in passage 88 to move therethrough downwardly through passage 92 and emerge in the space 94 between shoulder 96 and 98. As hydraulic fluid enters the space, cylinder 24 is hydraulically displaced downwardly relative to piston 28 until plunger 44 is returned to the normal position shown in FIGURE 2, at which time spool valve 54 is restored to the neutral position by the action of coil spring 56.

Upon upward displacement of plunger 54, coil spring 56 is momentarily compressed further as the washer 60 moves upwardly away from snap ring 64 on spool valve 54. The additional compression thus effected exerts upward biasing force on the spool valve through washer 58 and flange 62 urging the spool valve toward the position shown in FIGURE 4. As previously noted, the time rate response of upward movement of spool valve 54 is retarded by the dashpot action of flange piston 68 moving through the hydraulic fluid medium contained within the upper portion of bore 42. As soon as spool valve 54 reaches the positon shown in FIGURE 4, the clearance 78 formed in the spool valve is brought into partial registration with upper groove 80 and passage 90 enabling fluid contained in space 94 to move upwardly through passage 92 and 90 and emerge through port 84 into the reservoir 36.

As hydraulic fluid enters the space, cylinder 24 is hydraulically displaced downwardly relative to piston 28 until plunger 44 is returned to the normal position shown in FIGURE 2, at which time spool valve 54 is restored to the neutral position by the action of coil spring 56.

By reference to FIGURE 1, it will be seen that the direction of movement of plunger 44 is mechanically correlated with relative displacement between the vehicle sprung and unsprung mass by means of a pivoted drop link 130 which is connected at its opposite ends to lower control arm 12 and the free end of lever 48 respectively.

Since, as previously described, downward movement of plunger 44 results in hydraulic displacement of cylinder 24, it will be evident that an iincrease in load on the sprung mass will result in movement of link 130 upwardly relative to the sprung mass and thus urge the plunger in the downward direction causing hydraulic extension of cylinder 24 to occur with the result that the sprung mass is ultimately restored to the normal vertical level. Naturally, as the sprung mass rises, link 130 progressively restores the plunger to the neutral position and terminates the leveling action as previously described. Conversely, an increase in the height of the sprung mass causes the plunger to move upwardly and actuate the spool valve to the exhaust position previously described. To accommodate momentary extremes in vertical deflection of control arm 12, link 130 includes a two-way resilient connection 132 which allows movement of the arm beyond the mecahnical limits of travel of plunger 44. Resilient connection 132 comprises a pair of coil springs 134 and 136 caged in the sleeve end 138 of the upper rod portion 140 which act in opposition to the flanged end 142 of lower rod portion 144.

Inasmuch as vehicle suspension experiences both sustained and short term intermittent deflection, it will be evident that the leveling function occurs only upon sustained deflection equal to or greater than the time rate delay in response produced by the dashpot action previously described. However, during normal operation of the vehicle, a limited but almost continual short range and duration deflection occurs which causes the plunger 44 to constantly reciprocate relative to piston 28. In the present invention, the short term reciprocation of plunger 44 is utilized to operate the pump 74 to return hydraulic fluid from the reservoir to the accumulator chamber. In the illustrated embodiment, this is accomplished in the following manner. As the lower end 144 of plunger 44 descends in bore 72 of pump 74, any fluid already contained therein is discharged into accumulator chamber 86 through passage 106. Upon upward movement of the plunger, return of the fluid through passage 106 is prevented by check valve 110. However, the upward movement of plunger 44 creates a partial vacuum in the space 146 between the lower end of plunger 44 and the base of bore 72 which causes fluid in reservoir 36 to displace check valve 108 and enter the bore 72. Return downward movement of the plunger repeats the displacement mode previously described while check valve 108 prevents return of the fluid to reservoir 36. Therefore, short range wheel deflection typical of normal vehicle operation produces a continuous small displacement pumping action which constantly returns any fluid in the reservoir to the accumulator chamber where it is available for repetition of the leveling action previously described. In the event that no leveling action is required for long periods of vehicle operation, the pump 74 is prevented from pumping the entire contents of the reservoir into the accumulator chamber by the provision of a relief valve 133 which is set at a predetermined pressure above which fluid in accumulator 86 is allowed to return to the reservoir.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In combination with a coil spring disposed between the sprung and unsprung mass of a vehicle, a hydraulically extensible spring seat assembly disposed between one end of said spring and the adjacent mass, said assembly comprising a piston element fixed to said mass, a cup-shaped cylinder telescopingly engaging said piston element to form a variable volume fluid cavity therebetween, a fluid reservoir formed in said piston element, a first fluid circuit between said reservoir and said cavity, a fluid pressure chamber formed in said piston element, a second fluid circuit between said cavity and said chamber, a spool valve slidably disposed in said piston element movable in a path intersecting said first and second fluid circuits, a plunger slidably mounted in said piston element extending through said spool valve, linkage means operatively connecting said plunger to said unsprung mass, a coil spring connecting said spool valve and said plunger so that said spool valve is urged to a neutral circuit blocking position when said plunger is in a predetermined neutral position relative to said piston element while movement of said plunger in opposite directions therefrom acts through said spring to open said first and second circuits respectively, a third fluid circuit between said reservoir and said pressure chamber, a pump body disposed in said piston element in alignment with said spool valve and intersecting said third fluid circuit, means on said plunger forming a pump piston, and a deformable container in said chamber filled with compressible fluid under pressure.

2. In combination with a coil spring disposed between the sprung and unsprung mass of a vehicle, a hydraulically extensible spring seat assembly disposed between one end of said spring and the adjacent mass, said assembly comprising a piston element fixed to said mass, a cup-shaped cylinder telescopingly engaging said piston element to form a variable volume fluid cavity therebetween, a fluid reservoir formed in said piston element, a first fluid circuit between said reservoir and said cavity, a fluid pressure chamber formed in said piston element, a second fluid circuit between said cavity and said chamber, a spool valve slidable relative to said piston element in a path intersecting said first and second fluid circuits, a plunger slidably mounted in said piston element extending through said spool valve, linkage means operatively connecting said plunger to said unsprung mass, a coil spring connecting said spool valve and said plunger so that said spool valve is urged to a neutral circuit blocking position when said plunger is in a predetermined neutral position relative to said piston element while movement of said plunger in opposite directions therefrom acts through said spring to open said first and second circuits respectively, a third fluid circuit between said reservoir and said pressure chamber, a pump body disposed in said piston element in alignment with said spool valve and intersecting said third fluid circuit, means on said plunger forming a pump piston, a deformable container in said chamber filled with compressible fluid under pressure, and means for retarding the rate of response of said spool valve to movement of said plunger.

3. In combination with a coil spring disposed between the sprung and unsprung mass of a vehicle, a hydraulically extensible spring seat assembly disposed between one end of said spring and the adjacent mass, said assembly comprising a piston element fixed to said mass, a cup-shaped cylinder telescopingly engaging said piston element to form a variable volume fluid cavity therebetween, a fluid reservoir formed in said piston element, a first fluid circuit between said reservoir and said cavity, a fluid pressure chamber formed in said piston element, a second fluid circuit between said cavity and said chamber, a spool valve slidable relative to said piston element in a path intersecting said first and second fluid circuits, a plunger slidably mounted in said piston element extending through said spool valve, linkage means operatively connecting said plunger to said unsprung mass, a coil spring connecting said spool valve and said plunger so that said spool valve is urged to a neutral circuit blocking position when said plunger is in a predetermined neutral position relative to said piston element while movement of said plunger in opposite directions therefrom acts through said spring to open said first and second circuits respectively, a third fluid circuit between said reservoir and said pressure chamber, a pump body disposed in said piston element in alignment with said spool valve and intersecting said third fluid circuit, means on said plunger forming a pump piston, a deformable container in said chamber filled with compressible fluid under pressure, a dashpot acting on said spool valve to retard the rate of movement thereof, and a two-way resilient connection in said linkage means.

4. The structure set forth in claim 3 wherein said two-way resilient connection includes a coil spring having a higher rate than the rate of the coil spring connecting said plunger and spool valve.

5. A self-energizing hydraulic leveling device comprising, a fixed element, a movable element arranged in telescoping relation with said fixed element, means forming a space between said elements adapted to cause relative axial movement therebetween upon introduction of hydraulic fluid therein, a pressurized fluid chamber contained within said fixed element, passage means providing communication between said chamber and said space, a fluid reservoir contained within said fixed element, passage means providing communication between said space and said reservoir, valve means displaceable in opposite directions from a neutral position interrupting communication between said space and said reservoir and between said chamber and said space movable to a first position enabling communication from said chamber to said space only and to a second position enabling communication from said space to said reservoir only, means including a pump providing communication between said reservoir and chamber, a common operating element for said valve means and said pump, and means mounted externally of said fixed element for actuating said common element.

6. A self-energizing hydraulic leveling device comprising, a fixed element, a movable element arranged in telescoping relation with said fixed element, means forming a space between said elements adapted to cause relative axial movement therebetween upon introduction of hydraulic fluid therein, a pressurized fluid chamber contained within said fixed element, passage means providing communication between said chamber and said space, a fluid reservoir contained within said fixed element, passage means providing communication between said space and said reservoir, valve means axially displaceable in opposite directions from a neutral position interrupting communication between said space and said reservoir and between said chamber and said space movable to a first position enabling communication from said chamber to said space only and to a second position enabling communication from said space to said reservoir only, means including an axial displacement pump providing communication between said reservoir and chamber, a common axially displaceable operating element for said valve means and said pump, and means mounted externally of said fixed element for actuating said common element.

References Cited by the Examiner

UNITED STATES PATENTS

| 2,571,449 | 10/51 | Hobbs | 267—60 |
| 2,818,311 | 12/57 | Ashley | 267—60 X |
| 2,935,313 | 5/60 | Momchilov et al. | 267—20 |

FOREIGN PATENTS

| 536,263 | 5/41 | Great Britain. |
| 972,828 | 10/59 | Germany. |

ARTHUR L. LA POINT, *Primary Examiner.*